(12) United States Patent
Doerr et al.

(10) Patent No.: US 9,082,172 B2
(45) Date of Patent: Jul. 14, 2015

(54) DEVICE FOR GENERATING WATERMARK METADATA, ASSOCIATED DEVICE FOR EMBEDDING WATERMARK

(71) Applicant: Thomson Licensing, Issy de Moulineaux (FR)

(72) Inventors: Gwenael Doerr, Cesson Sevigne (FR); Antoine Robert, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 183 days.

(21) Appl. No.: 13/714,258

(22) Filed: Dec. 13, 2012

(65) Prior Publication Data

US 2013/0148843 A1    Jun. 13, 2013

(30) Foreign Application Priority Data

Dec. 13, 2011    (EP) .................................... 11306649

(51) Int. Cl.
*G06K 9/00*    (2006.01)
*G06T 1/00*    (2006.01)
*H04N 21/235*    (2011.01)
*H04N 21/2383*    (2011.01)
*H04N 21/2389*    (2011.01)
*H04N 21/8358*    (2011.01)
*H04L 9/32*    (2006.01)

(52) U.S. Cl.
CPC ............ *G06T 1/0021* (2013.01); *H04N 21/235* (2013.01); *H04N 21/2383* (2013.01); *H04N 21/23892* (2013.01); *H04N 21/8358* (2013.01)

(58) Field of Classification Search
CPC ................................ G06T 1/00; G06T 1/3232
USPC .............. 382/100, 232, 240; 380/51, 54, 201, 380/210, 252, 287; 713/176, 179; 358/3.28; 370/522–529; 283/72, 74, 113
See application file for complete search history.

(56) References Cited

U.S. PATENT DOCUMENTS

| | | | |
|---|---|---|---|
| 6,993,154 B2 * | 1/2006 | Brunk ........................... | 382/100 |
| 7,020,304 B2 * | 3/2006 | Alattar et al. ................. | 382/100 |
| 7,116,826 B2 * | 10/2006 | Umeda et al. ................. | 382/232 |
| 2006/0075240 A1 * | 4/2006 | Kalker et al. ................. | 713/176 |
| 2009/0080689 A1 | 3/2009 | Zhao et al. | |
| 2009/0116686 A1 * | 5/2009 | Samtani et al. ............... | 382/100 |
| 2010/0169349 A1 | 7/2010 | Zou et al. | |

(Continued)

OTHER PUBLICATIONS

European Search Report dated Jul. 2, 2012.

(Continued)

*Primary Examiner* — Abolfazl Tabatabai
(74) *Attorney, Agent, or Firm* — Myers Wolin LLC

(57) ABSTRACT

A device for generating metadata associated with a content intended to be watermarked with an identifier stored in a device for embedding a watermark is disclosed. The device for generating metadata comprises a processor configured to generate metadata. The metadata comprises (i) an instruction for deriving a current payload bit from the identifier wherein the current payload bit is determined from a lookup index wherein the instruction for deriving a current payload bit indicates to which position in the identifier corresponds the current payload bit, or from a XOR function applied to a plurality of bits of the identifier, wherein the instruction for deriving a current payload bit comprises a binary mask indicating which bits in the identifier corresponds to XORed bits.

16 Claims, 3 Drawing Sheets

(56) References Cited

U.S. PATENT DOCUMENTS

2011/0129116 A1 6/2011 Thorwirth
2011/0280434 A1 11/2011 Mamidwar

OTHER PUBLICATIONS

Das et al., "Performance Evaluation of Spread Spectrum Watermarking using Error Control Coding", IET-UK International Conference on Information and Communication Technology in Electrical Sciences (ICTES 2007), Chennai, TamilNadu, India, Dec. 20, 2007, pp. 708-711.

Preda et al., "Quantisation-Based Video Watermarking in the Wavelet Domain With Spatial and Temporal Redundancy", International Journal of Electronics, vol. 98, No. 3, Mar. 10, 2011, pp. 393-405.

* cited by examiner

DEVICE FOR GENERATING WATERMARK METADATA, ASSOCIATED DEVICE FOR EMBEDDING WATERMARK

This application claims the benefit, under 35 U.S.C. §119 of EP Patent Application 11306649.2, filed 13 Dec. 2011.

FIELD OF THE INVENTION

The invention relates to the general field of digital watermarking. More particularly, the invention relates to a device for generating and formatting watermark metadata associated with a content intended to be watermarked with an identifier.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It is now common practice for content provider to serialize audio-visual content which they distribute (screener, press previews, high definition video on demand, etc) in order to identify the source of a leak in a distribution network when copyrighted content is spotted on illegal distribution platforms (peer-to-peer, streaming, direct download). Digital watermarking is one technology that provides such serialization capabilities i.e. each recipient of the content owns, after watermark embedding, a slightly different version that uniquely identifies him/her.

Digital watermarking comprises error correction coding and modulation of the serialization message. The error correction code (ECC) is implemented to manage errors that may occur along the communication of the serialized content. The modulation is implemented through a spreading sequence to get a better resistance to communication distortion. ECC basically introduces redundancy to the message that is to be embedded. For instance, a m-symbols long serialization message is mapped to a n-symbols long encoded message (n>m). The spreading binary sequences are used to convey a single symbol of the encoded message. According to a particular embodiment, a lookup table maps each symbol to a s-bits long sequence. In the binary case, there are only two spreading sequences that are commonly either antipodal (all bits are different between the two sequences) or orthogonal (half the bits are orthogonal between the two sequences). Various embodiments of error correction coding and, modulation are described hereafter.

The watermark embedder is currently vowed to be deployed in end-user device firmware for security. Once released, it will not be possible to update the algorithm implemented on the device as if it was a simple piece of software. In other words, the error correction code, spreading sequence and serialization message need a priori to be "burnt" into the device. As a result, there is no easy means to update the algorithm once the devices are deployed. In other words, device is non-renewable regarding watermarking algorithm. Though, it could be desirable to modify such feature for improving the robustness of the watermarking system for instance after obtaining a better understanding of the piracy process.

However, when the serialization process is to be performed in low-cost consumer electronic devices, most of the computational cost is shifted in to a pre-processing step. The skilled in the art knows two-step watermark embedding process wherein watermarking assistance metadata are computed in a remote pre-processor. Watermarking assistance metadata comprise a value $\#S_i$ associated with a symbol $S_i$ and to an embedding position. The watermark embedder present in the device is then fed with watermarking assistance metadata to perform elementary operations such as switch-based embedding. In case of operations for embedding symbols $S_i$ at position N, such metadata comprises data for setting the byte at position N in the input stream to value $\# S_i$ if $S_i$ is to be embedded and iteratively for each symbol. However, known watermarking assistance metadata are limited and do not address the watermarking error correction coding and modulation previously described.

Thus known watermarking system raises the issue of modifying watermarking scheme, such as the modulation or error correction coding algorithm although not limited to those features, once devices are deployed.

Therefore, it is desirable for the embedder to be both (i) as simple as possible, and (ii) as flexible as possible. A watermark system is therefore needed that anticipate potential necessary changes in watermarking process and wherein the watermark embedder can accommodate as many of these changes without modifying the device firmware.

SUMMARY OF THE INVENTION

Since in two-steps watermarking framework an auxiliary communications channel carrying watermarking metadata already exists between the pre-processor and the embedder in order to reduce to a simple switching strategy the watermarked embedding, the main idea of the invention consists in further exploiting this auxiliary channel to carry error correction coding and modulation metadata at a slight overhead cost. Those metadata are namely used for deriving payload bits from an identifier and for embedding each payload bit in the content.

To this end, the invention relates to a device for generating metadata associated with a content intended to be watermarked with an identifier comprised in a watermark embedder, wherein the identifier is unknown from the device. The device being remarkable in that it comprises means for generating metadata, wherein metadata comprising instructions for deriving payload bits from the identifier and instructions for embedding each payload bit in the content; and in that it further comprises means for transmitting metadata to the watermark embedder, wherein the instructions dynamically drive said watermark embedder. The invention is advantageously well adapted to modifiable two-steps watermarking framework.

According to particularly advantageous characteristics, the instructions are adapted to drive said watermark embedder for modulation or error correction coding of the identifier.

In a first preferred embodiment, the device further comprises means for synchronizing metadata with the content by multiplexing metadata and content in a single stream, the single stream being adapted to determine a part of the content to which metadata apply.

In a second preferred embodiment, the content is transmitted in a main stream, the metadata are transmitted in a signaling stream, and the device further comprises means for synchronizing metadata and content, the metadata in the signaling stream are associated with positions in the main stream determining a part of the content to which metadata apply.

According to particularly advantageous characteristics, the instructions for deriving payload bits from the identifier comprises a first instruction determining a current payload bit; the first instruction comprises a lookup index indicating to which position in the identifier corresponds the current payload bit; the first instruction is regularly transmitted in order to achieve a determined spreading length.

According to particularly advantageous characteristics the instructions for deriving payload bits from the identifier comprises a second instruction determining a current payload bit; the second instruction comprises a binary mask indicating which bits among the identifier are XORed in order to obtain the current payload bit; the second instruction is regularly transmitted in order to achieve a determined spreading length.

According to particularly advantageous characteristics, the instructions for embedding each payload bit in the content comprise an embedding value adapted to achieve a determined spreading sequence; the instructions for embedding each payload bit in the content are transmitted between the regularly transmitted first instructions; or the instructions for embedding each payload bit in the content are transmitted between the regularly transmitted second instructions.

In second aspect, the invention also relates to a device for embedding a watermark identifying the device on a content comprising means for receiving the content; means for locally storing a device identifier. The embedding device is remarkable in that it further comprises means for receiving metadata from a watermark pre-processor, wherein the metadata comprises instructions for deriving payload bits from locally stored device identifier and instructions for embedding each payload bit. The embedding device further comprises means for deriving payload bits from locally stored device identifier wherein means for deriving payload bits are adapted to perform the instructions on the locally stored device identifier and comprises means for embedding the watermark on the content wherein means for embedding are adapted to perform the instructions.

According to particularly advantageous characteristics, means for deriving payload bits and means for embedding are adapted to perform the instructions for modulation or error correction coding of the device identifier.

According to particularly advantageous characteristics, the instructions for deriving payload bits from locally stored device identifier comprises a first instruction determining a current payload bit, wherein the first instruction comprises a lookup index indicating to which position in the locally stored identifier corresponds the current payload bit.

According to particularly advantageous characteristics, the instructions for deriving payload bits from locally stored device identifier comprises a second instruction determining a current payload bit, wherein the second instruction comprises a binary mask indicating which bits among the locally stored identifier are XORed in order to obtain the current payload bit.

In third aspect, the invention also relates to watermark metadata associated with a content intended to be watermarked with an identifier. The metadata are remarkable in that the metadata are generated by a watermark pre-processor for a watermark embedder, the watermark embedder comprising the identifier, and in that the metadata comprise instructions for deriving payload bits from the identifier and instructions for embedding each payload bit in the content, wherein the instructions dynamically drive the watermark embedder.

BRIEF DESCRIPTION OF THE DRAWINGS

Other characteristics and advantages of the invention will appear through the description of a non-limiting embodiment of the invention, which will be illustrated, with the help of the enclosed drawings.

Figure 1:
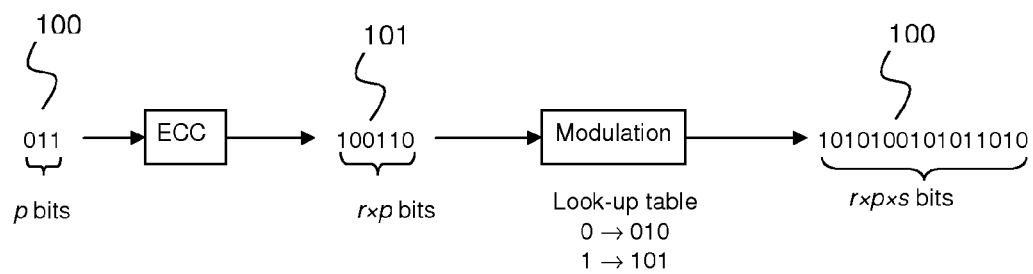
FIG. 1 illustrates derivation of payload bits in a watermark embedder according to prior art.

In the figure, the represented blocks are purely functional entities, which do not necessarily correspond to physically separate entities. These functional entities may be implemented as hardware, software, firmware, or a combination of thereof; furthermore, they may be implemented in one or more integrated circuits.

DETAILED DESCRIPTION OF PREFERRED EMBODIMENTS

Each feature or variant disclosed in the description, in the claims or in the drawings may be provided independently or in any appropriate combination.

For the reader not used to error correction and modulation, the principle of both functions implemented in a watermark embedder is described for a binary code. Indeed payload bits are derived from a serialization message after error correction coding and modulation in the watermark embedder.

FIG. 1 illustrates derivation of binary payload bits in a watermark embedder according to prior art. A baseline system is used to embed any message 100, commonly referred to as 'payload' or 'identifier'. The message 100 is represented through a binary code, however the system is not limited to binary message and is compatible with any N-ary message. Due to the fact that the watermarking channel could potentially be corrupted by an adversary, the bits of the binary message are not embedded directly. Instead, error correction is commonly applied as a means to improve the robustness of the system against subsequent distortions. In a particular embodiment, the message 100 is represented by a sequence of p bits. In an ECC coding step, redundancy is added to each bit of the message: the sequence of p bits is coded in a r×p bits long encoded message 101. In a modulation step, each bit of the encoded message 101 is then individually mapped to a s bits long spreading sequence. In other words, each bit of the message is associated with a s bits codeword through a 2×s look-up table for the variant of binary code (or through a N×s look-up table for N-ary codes). Once the end of the message is reached, should there still be some input content available; the first bit is sent over again and so on until the end of the content (conventional repetitive coding). Being given the message, the embedder is responsible for determining which bit to embed at each individual embedding position.

For the reader not used to switch based embedding, also called substitution embedding, the principle is described for a binary coding.

Figure 2:
FIG. 2 illustrates switch-based strategy in a watermark embedder according to prior art.

FIG. 2 illustrates switch-based strategy in a watermark embedder. The embedding module is repeatedly presented with tuples made of an embedding location 200, two alternate values 201, 202 associated with the binary value of the bit to embed. In a variant, the location or position comprises an offset from the start of some input buffer 203 such as an H.264 slice. The value of the bit to embed fully determines which one of the two alternate values 201, 202 to place in the stream. The selection of alternate values and embedding location is provided by the watermarking pre-processing step.

Figure 3:
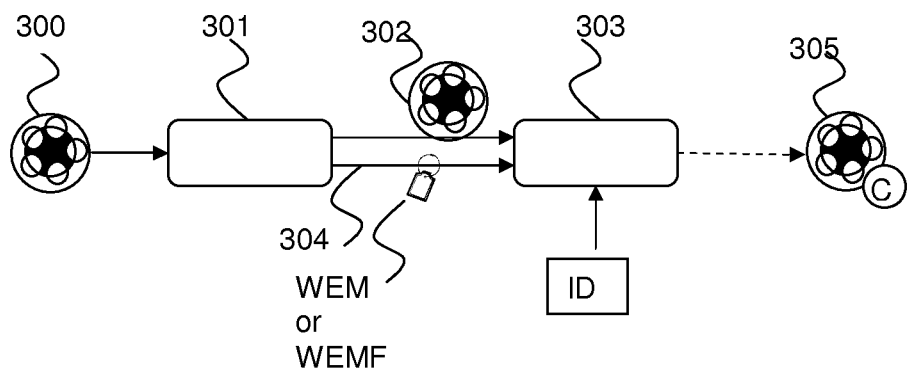
FIG. 3 illustrates a system for embedding watermark according to a particular embodiment.

FIG. 3 illustrates a system for embedding watermark according to a particular embodiment of the invention. A two-step watermarking system is made of two independent operations: computationally expensive pre-processing and fast watermark embedding. As a result, the computational load on the device integrating the watermark embedder 303 is drastically reduced. Prior to distribution, the content 300 encoded in a stream, called main stream, is pre-processed in a pre-processor 301 in order to identify positions in the encoded stream where a number of bits can be modified to insert a watermark. Due to fidelity constraints, these modifications of the stream are deemed not to induce any perceptible distortion. The pre-processor 301 performs the most time consuming task and forwards the produced Watermark Embedding Metadata (WEM)—including the embedding positions, and the alternate values which can be used—to the device 303 which will perform the actual watermark embedding. WEM are multiplexed with the encoded content stream 302 prior to encryption. In a variant, WEM are transmitted in an auxiliary stream 304, WEM are optionally encrypted.

As previously presented the embedding process in the device 303 then reduces to a simple switch between alternate values, the switch being driven by a message stored locally in the device, the identifier (ID) of the device and WEM. As a result, the consumer can only access to either the ciphered un-watermarked content 302 in input of the device, or the deciphered watermarked and decompressed content 305 in output of the device. If a customer was to ever attempt posting a copy of the content outputted by the device somewhere on the Internet, it would also contain the underlying forensic watermark.

The main idea of the invention is to provide formatted WEM, called WEMF further comprising modulation, error correction coding metadata and driving the watermark embedder. In others words, such metadata interact with the device firmware or hardware adapted to embed a watermark into a content, at a low level the watermark embedder executes the instructions comprised in the metadata described hereafter. Thus the WEMF allows a modification of the watermarking scheme at high level without modifying the device firmware of the watermark embedder. WEMF are now described.

Renewable Spreading Sequence Length.

Spreading sequences can be stored as a a×s matrix A, where a is the size of the alphabet (the number of possible symbols). In the binary case, a=2. The watermark embedder needs to know the parameter s in order to know on how many bits a symbol should be spread over. Instead of setting the value s and burning it into the device, the start of a new symbol could be indicated or triggered by an instruction (get_payload_bit) in the WEMF. Using the triggering instruction, the pre-processor is advantageously adapted to the usage of different spreading sequence lengths for different symbols in the encoded message. In a variant, the watermarking system may guarantee a better robustness to bit #1 than to bit #14, thus the bit #14 is spread with a higher spreading sequence length. Since the pre-processor knows the number of the bit to embed in the message, and the position of the embedding in the stream, the pre-processor synchronizes the transmission of the trigger with the bit number to embed.

Renewable Spreading Sequence.

The embedder should have access to the a×s lookup matrix A to perform the modulation of the encoded message. Again instead of storing the matrix A in the device, the modulation is emulated by an instruction in the WEMF. For each embeddable position, the metadata indicates an instruction to be performed depending on the bit to be embedded (which depends on the position of the bit of the spreading sequence associated with the current symbol). This can be represented with a very simple table:

| Embedding position | Instruction to embed symbol '0' | Instruction to embed symbol '1' |
|---|---|---|
| $pos_1$ | $inst_{1,0}$ | $inst_{1,1}$ |
| $pos_2$ | $inst_{2,0}$ | $inst_{2,1}$ |
| $pos_3$ | $inst_{3,0}$ | $inst_{3,1}$ |
| $pos_4$ | $inst_{4,0}$ | $inst_{4,1}$ |
| ... | ... | ... |

A typical instruction is for instance to set a number of bytes at a given position in the content bit stream to a specified value. In other words, the instruction $inst_{1,0}$ drives the switch-based embedder by indicating to embed the alternate value corresponding to bit 0 at the position 1 in the content. When the alphabet is binary (a=2), the spreading sequence is advantageously incorporated in the instructions by re-ordering the column of the table row by row. Let us assume for instance that the spreading sequence associated with symbol '0' starts with 100. It implies that the following sequence of instructions will be performed at the embedder knowing the spreading sequence: $inst_{1,1}$, $inst_{2,0}$, $inst_{3,0}$. Now let us assume that the pre-processor knows the spreading sequence, it can rearrange the metadata as follows:

| Embedding position | Instruction to embed '0' | Instruction to embed '1' |
|---|---|---|
| $pos_1$ | $inst_{1,1}$ | $inst_{1,0}$ |
| $pos_2$ | $inst_{2,0}$ | $inst_{2,1}$ |
| $pos_3$ | $inst_{3,0}$ | $inst_{3,1}$ |
| $pos_4$ | $inst_{4,1}$ | $inst_{4,0}$ |
| ... | ... | ... |

In the table, the label of the column relates to the binary symbol being transmitted rather than the binary bit of the spreading sequence associated with the binary symbol. As a result, to transmit symbol '0', the embedder simply needs to perform the instructions listed in column '0' sequentially. Instruction comprises a lookup index indicating to which position in the identifier corresponds the payload bit to embed. Besides, the substitution values corresponding either to the original block value or to an alternative block value corresponding to each payload bit to embed are transmitted in the metadata. The embedding value depends on the instructions associated with embedding of a payload bit '0' or '1' that has to be inserted at this position in the bit-stream according to the derivation of payload bit from the identifier to watermark. In our previous example, it would imply a sequence of instructions for embedding the payload bit comprising embedding value for 1, 0, 0, 1 . . . associated with payload bit '0' and embedding value for '0, 1, 1, 0 . . . associated with payload bit '1'. The instructions for embedding are generated by the pre-processor for the embedder and transmitted between 2 successive instructions (get_payload_bit) triggering the embedding of a new symbol.

In the table, we made the implicit assumption that the spreading sequence associated with symbols '0' and '1' were antipodal. Should they share some bits value at the same position, this could be easily accommodated for by replicating the same instruction on the associated row. Advantageously, the embedder no longer needs to store the spreading sequences to perform the embedding operations. Besides, the system according to this particular embodiment advantageously offers the flexibility to use different spreading sequences for different bits.

The system according to this particular embodiment is efficient for binary symbols. Using the same strategy with larger sized alphabets could require adding columns to the table, thus implying a larger amount of metadata to transmit. For instance, for a ternary code, a third column could be added to the table, and the values in the table could be re-ordered as for binary code. However, in this case, embedding values are repeated for each symbol causing the overhead.

Renewable Error Correction Code.

The serialization message or identifier, for instance implemented as a serial number, is only available at the embedder. The skilled in the art is thus conducted to consider that only the embedder can perform the ECC by combining bits of the identifier stored locally. Surprisingly, the pre-processor can be adapted to drive the embedder by exploiting the fact that a large family of ECC can be expressed using XOR operations. According to a variant, an ECC could be represented as:

$$e_1 = b_1 \oplus b_5 \oplus b_{12}$$

$$e_2 = b_2 \oplus b_3 \oplus b_8 \oplus b_{11}$$

$$e_3 = b_3 \oplus b_4 \oplus b_9$$

. . .

where $b_i$ is the $i^{th}$ bit of the identifier and $e_j$ the $j^{th}$ bit of the resulting encoded identifier. In prior art, even if the pre-processor knows the ECC being used, it cannot compute the encoded identifier since it does not have access to the individual bit of the identifier. However, the pre-processor according to a particular embodiment is adapted to drive the embedder by generating an instruction indicating how the bits should be derived from the locally stored identifier: the instruction comprises a binary mask indicating which bits among the bits of the identifier are XORed in order to obtain an encoded payload bit. In a variant, the instruction comprising the binary mask, called get_ecc_bit(mask) instruction, is placed in the stream of metadata at a position corresponding to the bit to embed. In our previous example, it would imply the following sequence of instructions is generated by the pre-processor to the embedder:

get_ecc_bit(100010000001 . . . )
get_ecc_bit(011000010010 . . . )
get_ecc_bit(001100001000 . . . )
. . . .

Assuming that the size of the mask is reasonable, the metadata overhead is advantageously not significant. This is typically the case for a serial number generally comprising between 48 and 64 bits and so as for the binary mask. As for other feature, the embedder advantageously no longer needs to be aware of the ECC in use and the pre-processor is adapted to update the ECC code at any time. As for renewable spreading sequence, watermark values are synchronously transmitted to the watermark embedder between 2 successive instructions.

The described instructions implementing dedicated features are used independently and are combined in any order and according to any feature. However, in a first preferred embodiment, the pre-processor implements only error correction code. In a second preferred embodiment, the pre-processor implements only modulation through spreading sequences.

According to different variants, the formatted watermark metadata are distributed in-band or out-of-band, i.e with the bit-stream or separately from the bit-stream. In a first variant, metadata and content are multiplexed in a single stream. The multiplexing is adapted to determine a part of the content to which metadata apply. For instance the single stream is a H.264 stream and metadata are multiplexed in SEI message of the H.264 stream. According to a particular characteristic, the instructions triggering a new symbol (get_payload) are repeated at the beginning of each NALU, the embedding is advantageously to the loss of NALU. Such characteristic could be adapted to any transmission of the content in packets. In a second variant, content is transmitted in a main stream and metadata are transmitted in a signaling stream. The metadata in the signaling stream are associated with positions or index in the main stream determining a part of the content to which metadata apply. For instance the single stream is a H.264 stream and metadata comprises positions relative to the start of each slice or to the start of the content.

Figure 4:
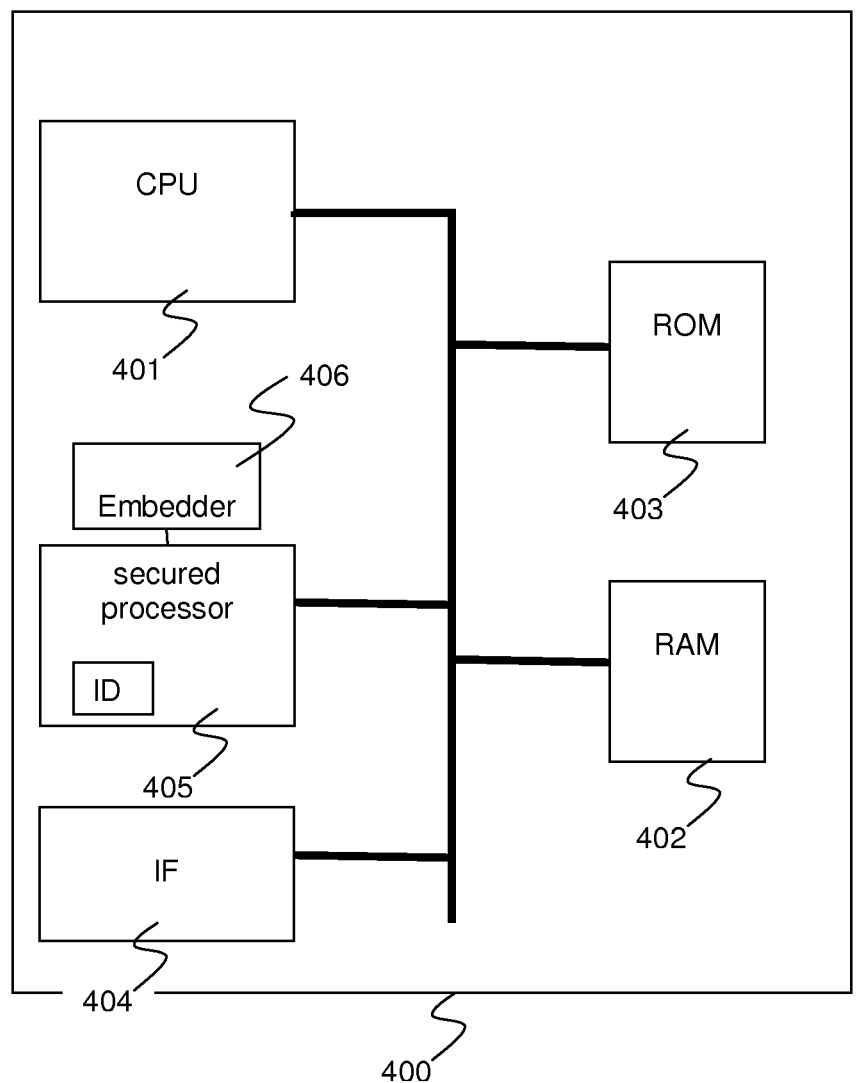
FIG. 4 illustrates a device for embedding watermark according to a particular embodiment.

FIG. 4 illustrates a device for embedding watermark according to a particular embodiment. Such devices comprise set-top-box, residential gateway, tablet and even PC, mobile phone or gaming device. Indeed, any device intended to serialize content and connected to a distribution network or comprising a media reader is compatible with the invention.

The device 400 comprises physical means intended to implement an embodiment of the invention, for instance a processor 401 (CPU), a data memory 402 (RAM or HDD), a program memory 403 (ROM), a network interface 404 (IF) a secured processor 405 linked to a hardware embedder 406. In a variant, instead of a network interface (IF) the device comprises an interface for acquiring digital content such as media reader. The secured processor 405 is provided with tamper resistant memory. The secure processor provides a secure environment for descrambling a content, storing key material, and a device identifier ID. Payload bits are derived from the identifier by error correction codong and modulation and payloads bits are watermarked in the content bit-stream according to the signalling instruction transmitted from the pre-processor. The identifier is used to identify the source of an illegal copy of the content.

According to an embodiment, an end user receives a content and associated metadata through the network interface. According to different variants, the formatted watermark metadata are transmitted in-band or out-of-band, i.e with the content bit-stream or separately from the bit-stream in an auxiliary signalling bit-stream. The bit-stream(s) is (are) temporarily stored in the data memory. As known from the skilled in the art, bit-streams representative of audio/video data are preferably protected before distribution. When the user accesses a bit-stream, this latter is processed in the secured processor for known protection removal (e.g. descrambling), but also watermarking. The secured processor 405 is equipped with a hardware embedder 406 adapted to execute WEMF instructions. In a variant, a software embedder is implemented in the secured processor. The received bit-stream is watermarked thanks to instruction synchronously delivered in the metadata by a watermarking pre-processor. The embedder derives payload bits from identifier and substitutes each block whose position is indicated or triggered in the metadata, by one of the values associated with the block and to payload bit value, also comprised in the metadata. All the features explained at the pre-processing step are derived In a variant, the device also comprises means to check the integrity of the bit-stream according to an embodiment of the invention.

In further processing dependant of the device, the un-encrypted and watermarked bit-stream is decoded in the processor 401 and sent towards rendering means such as a digital screen. In a variant, the watermarked bit-stream is exported through a home network to another user device.

A watermarking pre-processor comprises physical means intended to implement an embodiment of the invention, for instance a processor (CPU), a data memory (RAM, HDD), a program memory (ROM), a network interface and means for generating and formatting metadata either implemented in software or hardware. In a variant, the device comprises means to execute a watermark algorithm on the original bit-stream determining, for each watermarked block, a value for each possible watermark symbol and a position. The possible watermarked block values and position is memorized for each block. Original block value and position is also memorized for each block. The device further comprises means to format and synchronize metadata (WEMF) for error correction coding, modulation and embedding as described previously. According to different variants, the metadata are distributed in-band or out-of-band, i.e. with the bit-stream or separately from the bit-stream.

Naturally, the invention is not limited to the embodiments previously described. The invention is not limited to embodiments of the device for generating watermark metadata, the device for embedding a watermark, described previously, only as an example, but encompasses any variants that may be considered by those skilled in the art within the scope of the claims hereafter.

What is claimed is:

1. A device for generating metadata associated with content intended to be watermarked with an identifier stored in a device for embedding a watermark wherein said device for generating metadata comprises a processor configured to:
   generate an instruction in the metadata for deriving a current payload bit from said identifier so as to enable the device for embedding the watermark to
   obtain a bit from said identifier located at a position given by a lookup index, the lookup index indicating a position in the identifier that corresponds to the current payload bit to embed, or said identifier to enable the watermark embedding device to apply an exclusive or operation to a plurality of bits of said identifier, wherein said plurality of bits is obtained using a binary mask contained in said instruction, the metadata further comprising a number of instructions for embedding said current payload bit in said content according to a spreading sequence wherein the number of instructions for embedding corresponds to a length of the spreading sequence, wherein said instruction for embedding said current payload bit comprises a first embedding value corresponding to a payload bit value of '0' and a second embedding value corresponding to a payload bit value of '1' and wherein at least one pair of embedding values are ordered according to said spreading sequence.

2. A device according to claim 1 wherein said device further comprises a network interface for transmitting metadata to the device for embedding a watermark.

3. A device according to claim 1 wherein said processor is further configured to synchronize metadata with the content by multiplexing metadata and content in a single stream, said single stream being adapted to determine a part of the content to which metadata apply.

4. A device according to claim 1 wherein said device further comprises a network interface configured to transmit said content in a main stream and to transmit said metadata in a signaling stream, and wherein said processor is further configured to synchronize metadata and content such that said metadata in the signaling stream are associated with positions in the main stream determining a part of the content to which metadata apply.

5. A device for embedding a watermark on content, the device comprising:
   a network interface configured to receive said content and to receive metadata from a watermark pre-processor, the metadata comprising an instruction for deriving a current payload bit from an identifier;
   a processor configured to:
   store the identifier;
   read an instruction from the metadata for deriving a current payload bit from said identifier; and
   obtain a bit from said identifier located at a position given by a lookup index, the lookup index indicating a position in the identifier that corresponds to the current payload bit to embed or apply an exclusive or operation to a plurality of bits of said identifier, wherein said plurality of bits is obtained using a binary mask contained in said instruction, the metadata further comprising a number of instructions for embedding said current payload bit in said content according to a spreading sequence wherein the number of instructions correspond to a length of the spreading sequence, wherein said instruction for embedding said current payload bit comprises a first embedding value corresponding to a payload bit value of '0' and a second embedding value corresponding to a payload bit value of '1' and wherein at least one pair of embedding values are ordered according to said spreading sequence.

6. The device according to claim 5, wherein said processor comprises a secure processor with tamper resistant memory.

7. The device according to claim 6, wherein the secure processor further comprises a hardware embedder to execute the instruction from the metadata.

8. The device according to claim 5, wherein the content is multiplexed with the metadata in a single stream, said single stream being adapted to determine a part of the content to which metadata is to apply.

9. A non-transitory computer readable medium with watermark metadata stored therein, the watermark metadata being associated with content intended to be watermarked with an identifier wherein said metadata are generated by a watermark pre-processor, the metadata enabling a device for embedding a watermark to:
   read an instruction in the metadata for deriving a current payload bit from said identifier; and
   obtain a bit from said identifier located at a position given by a lookup index, the lookup index indicating a position in the identifier that corresponds to the current payload bit to embed, or apply an exclusive or operation on a plurality of bits of said identifier, wherein said plurality of bits is determined by a binary mask contained in said instruction, the metadata further comprising a number of instructions for embedding said current payload bit in said content according to a spreading sequence wherein the number of instructions corresponds to a length of the spreading sequence, wherein said instruction for embedding said current payload bit comprises a first embedding value corresponding to a payload bit value of '0' and a second embedding value corresponding to a payload bit value of '1' and wherein at least one pair of embedding values are ordered according to said spreading sequence.

10. The non-transitory watermark metadata of claim 9, wherein the device for embedding the watermark comprises a secure processor with tamper resistant memory.

11. The non-transitory watermark metadata of claim 10, wherein the secure processor further comprises a hardware embedder to execute the instruction from the metadata.

12. The non-transitory watermark metadata of claim 9, wherein the content is multiplexed with the metadata in a single stream, said single stream being adapted to determine a part of the content to which metadata is to apply.

13. A method for generating metadata associated with a content intended to be watermarked with an identifier stored in a device for embedding a watermark, said method implemented in a processor, the method comprising:

generating an instruction in the metadata for deriving a current payload bit from said identifier the instruction enabling the device for embedding the watermark to obtain a bit from said identifier located at a position given by a lookup index, the lookup index indicating a position in the identifier that corresponds to the current payload bit to embed, or to apply an exclusive or operation on a plurality of bits of said identifier, wherein said plurality of bits is obtained using a binary mask contained in said instruction, the metadata further comprising a number of instructions for embedding said current payload bit in said content according to a spreading sequence wherein the number of instructions corresponds to a length of the spreading sequence, wherein said instruction for embedding said current payload bit comprises a first embedding value corresponding to a payload bit value of '0' and a second embedding value corresponding to a payload bit value of '1' and wherein at least one pair of embedding values are ordered according to said spreading sequence.

14. The method according to claim 13, further comprising multiplexing the metadata and the content in a single stream, said single stream being adapted to determine a part of the content to which metadata apply.

15. The method according to claim 13 further comprising multiplexing the metadata and the content, the content being an H.264 stream and the metadata being multiplexed in a field of the H.264 stream.

16. The method according to claim 13, further comprising transmitting the content and the metadata to the device for embedding the watermark such that the content is in a main stream and the metadata is in a signaling stream.

* * * * *